(12) United States Patent
Elliott et al.

(10) Patent No.: US 7,747,900 B2
(45) Date of Patent: Jun. 29, 2010

(54) THRESHOLDING SYSTEM POWER LOSS NOTIFICATIONS IN A DATA PROCESSING SYSTEM BASED ON VITAL PRODUCT DATA

(75) Inventors: John Charles Elliott, Tucson, AZ (US); Robert Akira Kubo, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 11/695,322

(22) Filed: Apr. 2, 2007

(65) Prior Publication Data

US 2008/0244311 A1 Oct. 2, 2008

(51) Int. Cl.
*G06F 11/00* (2006.01)
*G06F 1/30* (2006.01)

(52) U.S. Cl. ............................ 714/22; 714/24; 713/300; 713/340

(58) Field of Classification Search ................. 714/22, 714/24; 713/340, 300
See application file for complete search history.

(56) References Cited

U.S. PATENT DOCUMENTS

| | | | | |
|---|---|---|---|---|
| 4,245,150 | A | * | 1/1981 | Driscoll et al. ................. 377/32 |
| 4,376,968 | A | | 3/1983 | Wueschinski et al. |
| 5,117,324 | A | * | 5/1992 | Johnson, Jr. .................. 361/66 |
| 5,264,782 | A | | 11/1993 | Newton |
| 5,404,904 | A | | 4/1995 | Glaser |
| 5,781,448 | A | * | 7/1998 | Nakamura et al. .......... 700/293 |
| 6,061,668 | A | | 5/2000 | Sharrow |
| 6,175,927 | B1 | | 1/2001 | Cromer et al. |
| 6,195,754 | B1 | | 2/2001 | Jardine et al. |
| 6,304,981 | B1 | * | 10/2001 | Spears et al. .................. 714/24 |
| 6,339,793 | B1 | | 1/2002 | Bostian et al. |
| 6,345,369 | B1 | | 2/2002 | Kitamorn |
| 6,363,422 | B1 | | 3/2002 | Hunter et al. |
| 6,772,366 | B2 | | 8/2004 | Nguyen et al. |
| 6,823,475 | B1 | | 11/2004 | Harker |
| 6,854,066 | B1 | | 2/2005 | LeFevre et al. |

(Continued)

OTHER PUBLICATIONS

U.S. Appl. No. 11/695,297, filed Apr. 2, 2007, Elliott et al.

(Continued)

*Primary Examiner*—Scott T Baderman
*Assistant Examiner*—Joseph Schell
(74) *Attorney, Agent, or Firm*—Stephen J. Walder, Jr.; Randall J. Bluestone

(57) ABSTRACT

Mechanisms for thresholding system power loss notifications in a data processing system are provided. Power loss detection modules are provided in a data processing system having one or more data processing devices, such as blades in an IBM BladeCenter® chassis. The power loss detection modules detect the type of infrastructure of the data processing system, a position of a corresponding data processing device within the data processing system, and a capability of the data processing system to provide power during a power loss scenario. The detection module detects various inputs identifying these types of data processing system and power system characteristics and provides logic for defining a set of behaviors during a power loss scenario, e.g., behaviors for sending system notifications of imminent power loss. The detection of the various inputs and the defining of a set of behaviors may be performed statically and/or dynamically.

9 Claims, 10 Drawing Sheets

U.S. PATENT DOCUMENTS

| | | | |
|---|---|---|---|
| 7,002,265 | B2 | 2/2006 | Potega |
| 7,013,399 | B2 | 3/2006 | Sisler et al. |
| 7,023,691 | B1 | 4/2006 | Feight et al. |
| 7,024,649 | B2 | 4/2006 | Collmeyer et al. |
| 7,043,647 | B2* | 5/2006 | Hansen et al. ............. 713/320 |
| 7,062,675 | B1 | 6/2006 | Kemeny et al. |
| 7,081,924 | B2 | 7/2006 | Tsuda |
| 7,082,373 | B2 | 7/2006 | Holle |
| 7,088,078 | B2 | 8/2006 | Liu |
| 7,243,243 | B2* | 7/2007 | Gedeon ...................... 713/300 |
| 7,299,385 | B2 | 11/2007 | Voigt |
| 7,321,174 | B2* | 1/2008 | Jones et al. ................... 307/66 |
| 2003/0095366 | A1 | 5/2003 | Pellegrino |
| 2004/0022285 | A1 | 2/2004 | Romm |
| 2004/0070278 | A1 | 4/2004 | Divan et al. |
| 2006/0112305 | A1 | 5/2006 | Cagno et al. |
| 2006/0123253 | A1 | 6/2006 | Morgan et al. |
| 2006/0140211 | A1 | 6/2006 | Huang et al. |
| 2006/0146461 | A1 | 7/2006 | Jones et al. |
| 2006/0161794 | A1 | 7/2006 | Chiasson et al. |
| 2006/0242463 | A1* | 10/2006 | Yasui et al. ................... 714/22 |
| 2007/0278020 | A1 | 12/2007 | Harris et al. |
| 2008/0244283 | A1 | 10/2008 | Elliott et al. |
| 2008/0244311 | A1 | 10/2008 | Elliott |

OTHER PUBLICATIONS

Lee, Byongjun et al., "A Piecewise Global Small-Disturbance Voltage-Stability Analysis of Structure-Preserving Power System Models", IEEE Transactions on Power Systems, vol. 10, Issue 4, Nov. 1995, pp. 1963-1971.

Office Action mailed Dec. 28, 2009 for U.S. Appl. No. 11/695,297.

Response to Office Action filed with the USPTO on Mar. 24, 2010 for U.S. Appl. No. 11/695,297; 13 pages.

\* cited by examiner

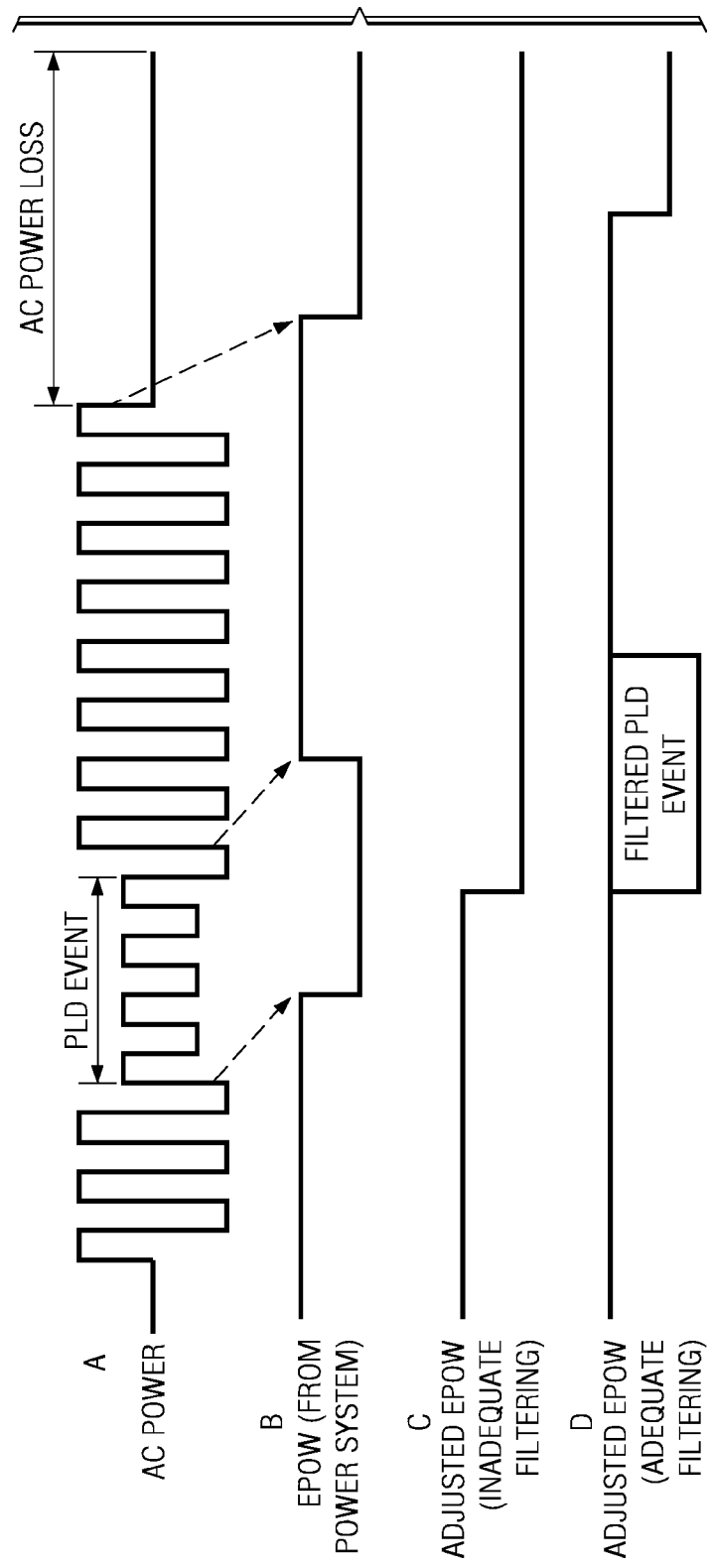

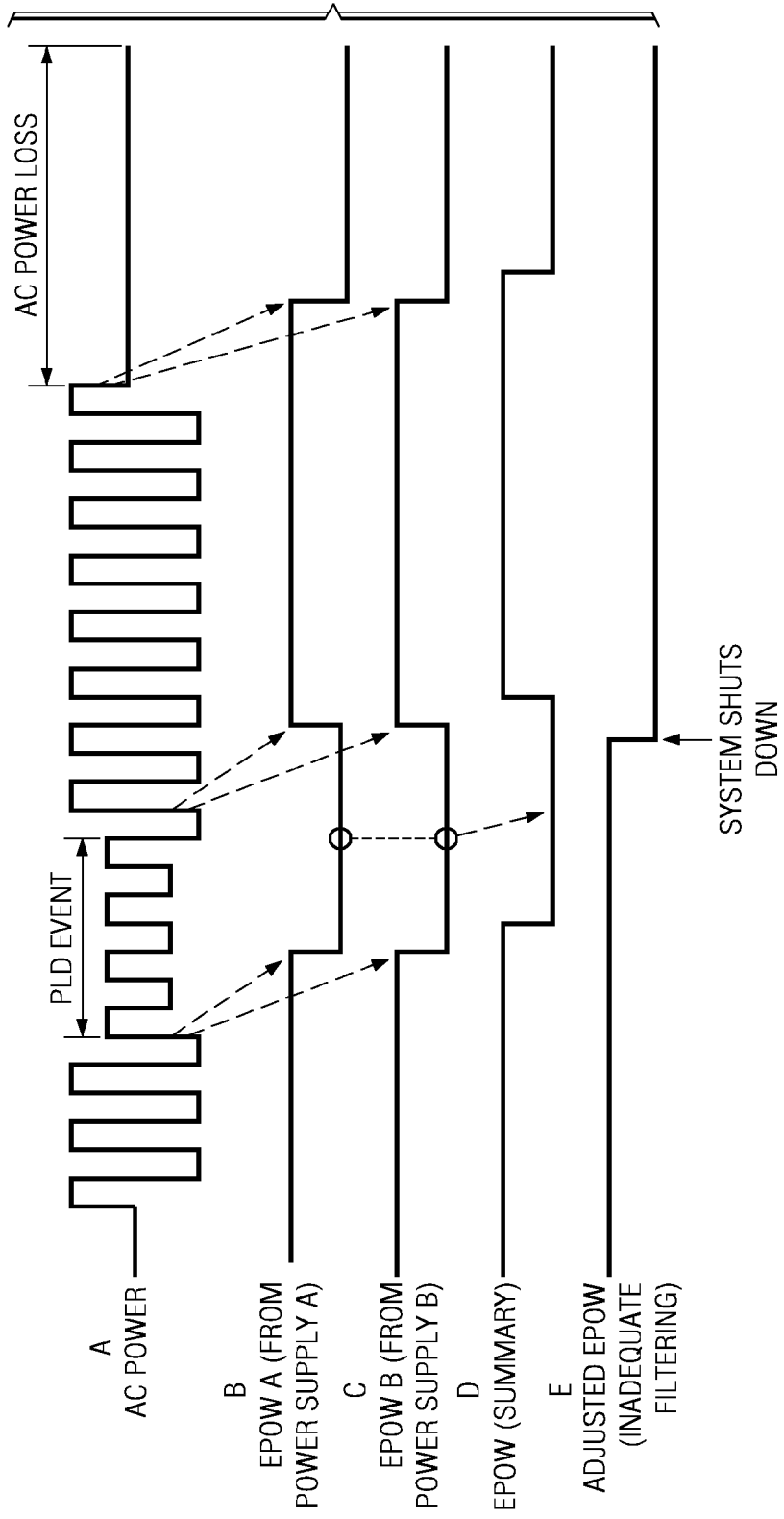

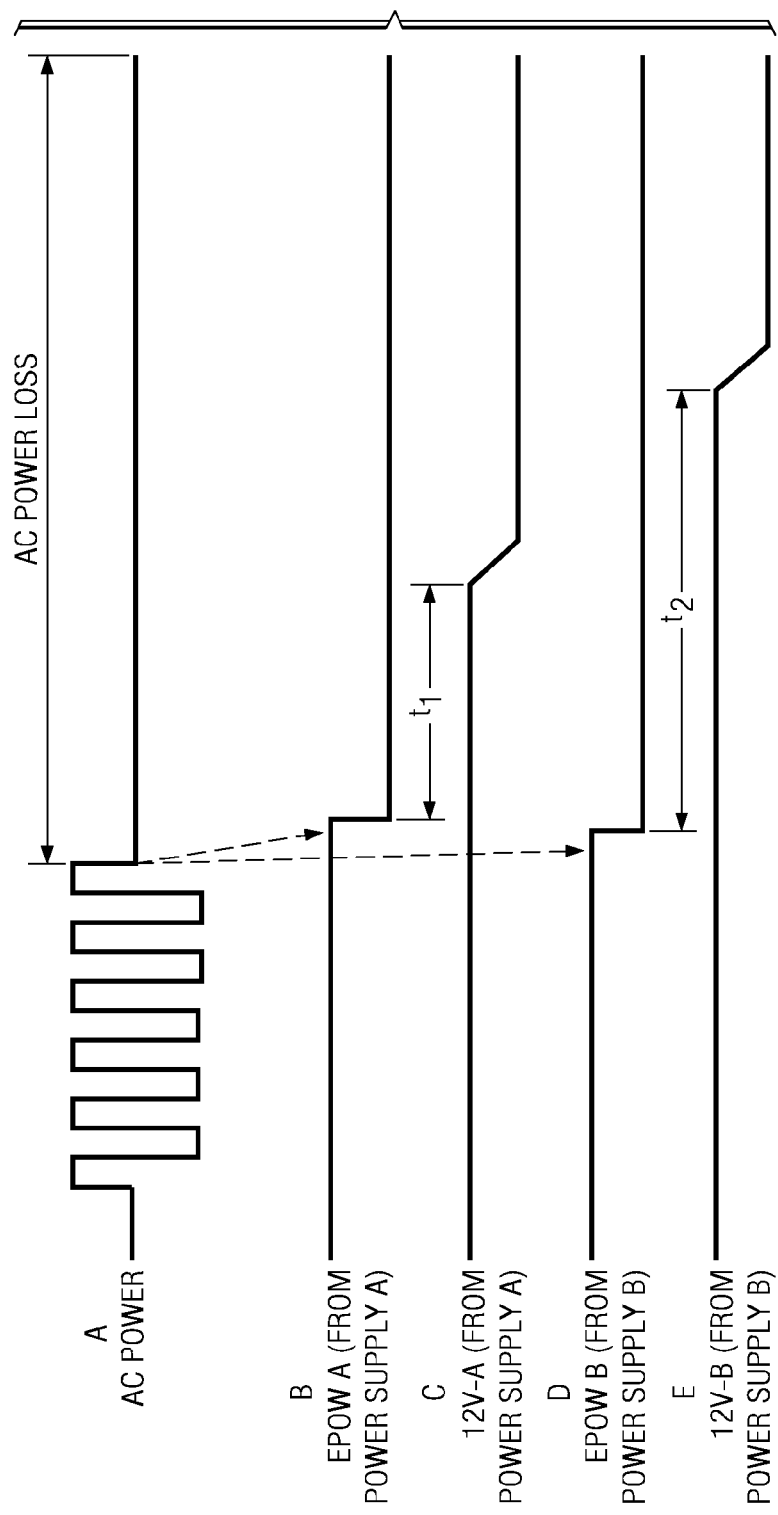

THRESHOLDING SYSTEM POWER LOSS NOTIFICATIONS IN A DATA PROCESSING SYSTEM BASED ON VITAL PRODUCT DATA

BACKGROUND

1. Technical Field

The present application relates generally to an improved data processing system and method. More specifically, the present application is directed to a system and method for thresholding system power loss notifications in a data processing system based on vital product data.

2. Description of Related Art

As with most data processing devices in today's 24 hour a day, seven day a week world, modern storage systems are vulnerable to Power (or Pulse) Line Disturbance (PLD) events, e.g., power utility grid interruptions, such as may be due to lightning strikes or the like. A PLD is a transient or temporary fluctuation in power supplied over a power line to an electronic device. While a PLD may cause a fluctuation in the power provided to a data processing device, in general, the PLD is a recoverable event, i.e. it is not a power loss event that requires the shutting down of the data processing system.

Some locales experience frequent PLD event conditions during "stormy" times. However, it is undesirable to shutdown a data processing system, such as a storage system, for example, because of such frequent PLD events since the data processing system may easily recover from PLD events. If a storage system is shut down, for example, data availability is lost and there may be potential data integrity issues for I/O operations that may be pending. Thus, it is imperative that storage systems and other data processing systems be able to weather PLD events.

Besides the issue of PLDs, storage systems and other data processing systems must also be concerned about more permanent power outages, such as loss of all AC line cord power. Such AC loss events need to be properly handled by having power systems that support an Early Power Off Warning (EPOW) function. This function is used to properly and orderly quiesce input/output (I/O) activity to the storage devices of a storage system or data processing system prior to the power decay being seen by the storage devices. Writing data to a storage device, such as a disk drive, while its power is decaying can result in data integrity problems.

Moreover, storage systems that support write caching, i.e. sending an acknowledgement to an initiator of the write operation indicating completion of the write operation prior to the actual data being made persistent on storage media, are required to provide a guarantee that the data will be retrievable even if there is a power outage. Thus, both PLD and EPOW events must be handled by storage systems and other data processing systems.

It should be appreciated that "real" EPOW events are effectively permanent PLDs which cause all power to be lost to the system. To accommodate real EPOW events and temporary PLD events, a system typically must include costly and complex power supply system mechanisms for implementing a sufficient holdup capacitance time to accommodate a reasonably long PLD event, as well as continued holdup capacitance time to support quiescing storage device activity prior to the actual voltage boundaries decaying, i.e. becoming out of specification. This is generally achieved with the power supply output capacitance. In order to achieve desired PLD ride through and EPOW time, i.e. holdup capacitance time, some systems implement power supplies with large amounts of added capacitance or other power extending technology, e.g., super capacitors, batteries, etc., to the power supply system implementation.

It should be appreciated that the additional capacitance added to systems, to provide some level of power holdup capacitance time, increases the cost and complexity of the overall system. Because of this cost and complexity, some products choose to not implement such extensive mechanisms. In fact, standard practice for conventional power supply system design uses a single mechanism for indicating a PLD event or a "real" EPOW event. That is, when a PLD event occurs the power system also generates an EPOW event, just as with the "real" power loss case, which results in the same system behavior as the "real" EPOW event. In other words, PLD events are mapped into EPOW events and thus, are handled in the same fashion. This creates a problem whereby the system may not be able to differentiate between a real EPOW event and a PLD event.

SUMMARY

In view of the above, it is desirable to provide mechanisms in a data processing system to differentiate between a Power Line Disturbance (PLD) event and an actual power loss event. Furthermore, it is desirable to delay the Early Power Off Warning (EPOW) notification as long as possible to allow a Power Line Disturbance (PLD) event to correct itself, thereby preventing a system outage due to a long PLD event. Moreover, it is desirable to provide mechanisms in a data processing system to support storage systems that support write caching so as to enable the storage system to preserve data integrity in the case of a power loss. Furthermore, it is desirable to provide mechanisms that tailor the PLD event versus actual power loss event differentiation and the timing of the sending of Early Power Off Warning (EPOW) messages to current conditions of the data processing system, characteristics of the power supplies, power consumption of operational elements in the data processing system, and previous measured holdup capacitance times.

With the illustrative embodiments, one or more power loss detection modules are provided in a data processing system having one or more data processing devices. The one or more power loss detection modules may be provided in association with each data processing device. The power loss detection module may detect the type of infrastructure of the data processing system, a position of the data processing device within the data processing system, and a capability of the data processing system to provide power during a power loss scenario. The detection module detects various inputs identifying these types of data processing system and power system characteristics and provides logic for defining a set of behaviors during a power loss scenario. The detection of the various inputs and the defining of a set of behaviors may be performed statically and/or dynamically.

In one illustrative embodiment, the power loss detection modules receive inputs identifying which power supply modules are providing a good power signal to the data processing devices. The power loss detection modules may further receive Early Power Off Warning (EPOW) inputs from the power supply modules indicating whether a power loss from the power supply module is imminent. Further inputs to the power loss detection modules may include a data processing system type input from a data processing system management module and a data processing device location input from logic of the data processing device identifying a position of the data processing device within the data processing system. These inputs may all be processed by logic in the power loss detection module in order to determine a timing for outputting a system notification of an impending power loss such that I/O operations may be quiesced and the data processing device may be placed in a state that preserves customer data integrity.

In one illustrative embodiment, the data processing system type and the data processing device position, e.g., slot identifier, are used to determine which of the inputs to the power loss detection module for that data processing device are of significance. If the data processing device is completely located in one power distribution network power domain, then only the EPOW inputs and the power good inputs, i.e. the input voltages, from that domain are relevant and qualified for usage by the power loss detection module for determining a power state of the data processing device.

If the data processing device is straddling multiple power distribution network power domains, then each of the power module EPOW inputs and input voltages providing power to the data processing device are relevant and qualified for usage in the determination of the power state of the data processing device. For example, in a data processing system there may be two power domains with each power domain having a redundant power supply module for a total of four power supply modules providing DC power from four AC inputs. It should be appreciated, however, that any number of power supply modules and AC power inputs may be used with the mechanisms of the illustrative embodiments without departing from the spirit and scope of the illustrative embodiments.

The EPOW signals and input voltage, i.e. power good, signals from each power supply module feeding the data processing device need to be monitored. When a data processing device straddles both domains, four power feeds are monitored. Each of the power supply modules has a capacitive output stage capable of providing "x" amount of holdup capacitance time. Dependent upon the timing of the AC input loss events detected by each power supply module, and the number of active power supply modules connected to the data processing device, the PLD holdup capacitance time is determined by the mechanisms of the illustrative embodiments, after which time the data processing device EPOW needs to be generated resulting in shutdown of the data processing device regardless of subsequent resumption of AC input.

Once the relevant power management inputs to the power loss detection module are determined, the relevant power management inputs are monitored and used to generate a system notification output for indicating an impending power loss. The generation of this system notification output is performed based on a determined amount of reserve power required in order to place the data processing device in a state where data integrity may be maintained. The number of power module devices providing valid, i.e. "good", power input into the data processing device defines an amount of reserve power available, i.e. duration in time where power can be expected to be maintained within regulation after the sending of an EPOW by the power module, to the data processing device during a power loss scenario.

The data processing system type and the location or position of the data processing device within the data processing system identifies which power supply modules provide power to the data processing device. The power good input signals identify which of the power supply modules providing power to the data processing device are providing a valid, or good, power input to the data processing device. The number of power supply modules providing valid power to the data processing device is then converted into a reserve power calculation identifying a time value of an expected period of time that valid power will be provided to the data processing device after an EPOW notification from a power module. The reserve power calculation identifies a holdup capacitance time, i.e. a time difference between when an EPOW notification signal is asserted and when the output voltage of the corresponding power supply module begins to decay. A table data structure of holdup capacitance times based on a number of power supply modules providing valid power to the data processing device may be used to correlate the determined number of power supply modules providing valid power into a holdup capacitance time value for use in determining a timing for sending a system notification and filtering out Power Line Disturbances, as discussed hereafter.

The amount of reserve power determined by the power loss detection module is used along with a predetermined amount of time required for the data processing device to process an EPOW notification so as to place the data processing device into a state where data integrity is preserved, e.g., by quiescing I/O operations, to determine a timing for sending a system notification of impending power loss. This system notification of impending power loss may be output to the data processing device's management module and/or the data processing system's management module to thereby cause the data processing device to power-down in a manner that preserves data integrity.

The determined amount of reserve power required, in terms of milliseconds of power supply, identifies a duration of a Power Line Disturbance that may be tolerated by the data processing device. That is, the difference between the amount of reserve power and the amount of time required to process an EPOW notification in the data processing device results in a maximum Power (or Pulse) Line Disturbance (PLD) time period, i.e. a PLD filter time, that may be tolerated by the system before a system notification of an impending power loss is sent to the data processing device/system's management module.

The data processing devices in the data processing system may have different power consumption characteristics from each other. A management module of the data processing system may selectively power on various ones of the data processing devices based on an available power capacity of the power system in order to optimize the data processing system. This data processing system configuration status information may be stored as part of the Vital Product Data (VPD) in a storage device associated with the management module.

The mechanisms of the illustrative embodiments may interpret this VPD information into a table of values representing how much PLD filter time should be applied to the sending of a system notification of impending power loss based on an EPOW notification from a power supply module. This PLD filter time may be communicated to controllers of the power supply modules and stored in their respective VPD storage devices for use in determining when or how long to assert an EPOW notification signal. Essentially, the mechanisms of the illustrative embodiments may not only take into account the characteristics of power supply modules providing power to a particular data processing device, but also the power consumption characteristics of the data processing devices that are powered on in the data processing system, when determining a PLD filter time and the timing for sending a system notification of an impending power loss.

In other illustrative embodiments, VPD information storage devices associated with the power supply modules may be used to store information regarding the various holdup capacitance time values of the power supply modules in the power system of the data processing system. For example, at manufacture time, the holdup capacitance time value for the power supply modules may be measured and stored as part of the VPD information. This measured holdup capacitance time may be used to adjust the length of time that an EPOW notification signal is asserted before sending a system notification of an impending loss of power.

In a further illustrative embodiment, the actual holdup capacitance time for a power supply module may be measured by a controller of the power supply module during every power-down scenario. The controller may monitor the EPOW notification assertion in conjunction with the power supply module's respective voltage input to the controller. The controller may store values corresponding to the elapsed time from when an EPOW notification signal is no longer asserted to when the actual power input to the controller begins to decay and may store this information in non-volatile memory prior to the power supply module losing all power. This may be done for each power supply module such that a plurality of elapsed time values, i.e. holdup capacitance times, may be stored in non-volatile memory. It should be noted that even though the power is decaying while the non-volatile memory is being updated, there is sufficient time to complete the update due to internal power regulation mechanisms maintaining stable voltages.

After power is restored to the data processing system, the management module may read the non-volatile memory and compare the holdup capacitance time values. The largest value may be selected and applied to the PLD filtering circuitry. This directly results in being able to threshold the largest PLD event possible given the largest actual holdup capacitance time of the combined power supply modules in the data processing system.

In one illustrative embodiment, a method, in a data processing system, for controlling assertion of an imminent power loss notification signal notifying the data processing system of an imminent loss of power to a data processing device is provided. The method may comprise accessing vital product data (VPD) information for each of a plurality of data processing devices within the data processing system and identifying one or more data processing devices of the plurality of data processing devices that are powered-on to a fully functional state. The method may further comprise determining a current power distribution network configuration relative to the one or more data processing devices based on the identified one or more data processing devices that are powered-on to a fully functional state, in response to a power supply module of the data processing system asserting an Early Power Off Warning (EPOW) signal. A power loss notification signal, which is indicative of an imminent power loss to the data processing device, may be asserted to logic of the data processing system based on the determined current power distribution network configuration relative to the one or more data processing devices.

The power loss notification signal may be asserted to logic of the data processing system by calculating a Power (or Pulse) Line Disturbance (PLD) filter time based on the determined current power distribution network configuration. The power loss notification signal may be asserted if the power supply module asserts the EPOW signal for longer than the PLD filter time.

Calculating the Power Line Disturbance (PLD) filter time based on the determined current power distribution network configuration may comprise calculating a system load value based on the identified one or more data processing devices that are powered-on to a fully functional state and adjusting the PLD filter time based on the system load value. The VPD information for each of the plurality of data processing devices may comprise power consumption information for a corresponding data processing device. The system load value may be calculated based on the power consumption information corresponding to the one or more data processing devices that are powered-on to a fully functional state. Adjusting the PLD filter time based on the system load value may comprise decreasing the PLD filter time with increased system load value.

The method may further comprise measuring an actual holdup capacitance time for the power supply module and storing the actual holdup capacitance time in a vital product data (VPD) storage device associated with the power supply module. The current power distribution network configuration may be determined based on the actual holdup capacitance time stored in the VPD storage device associated with the power supply module. The actual holdup capacitance time may be measured at one of manufacture or testing time of the power supply module.

The actual holdup capacitance time may be measured dynamically during a power-down operation of the power supply module. The actual holdup capacitance time for a plurality of power supply modules of the data processing system may be measured dynamically during power-down operations of the plurality of power supply modules.

Moreover, the actual holdup capacitance time for each of the plurality of power supply modules is stored in one or more non-volatile memories associated with the plurality of power supply modules prior to complete loss of power by the power supply modules during the power-down operations. The actual holdup capacitance time values for each of the plurality of power supply modules of the data processing system may be read from the one or more non-volatile memories by a management module of the data processing system in response to a restoration of power to the plurality of power supply modules. A largest actual holdup capacitance time of the plurality of power supply modules may be utilized to calculate an adjustment value for adjusting the PLD filter time.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a data processing system is provided. The data processing system may comprise at least one data processing device, at least one power supply module coupled to the at least one data processing device, and power loss detection logic coupled to at least one of the at least one data processing device or the at least one power supply module. The power loss detection logic, and/or other logic provided in the data processing system, may perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an exemplary timing diagram illustrating a Power Line Disturbance event and the filtering of the Power Line Disturbance event in the assertion of an EPOW signal in accordance with one illustrative embodiment;

FIG. 4 is an exemplary timing diagram illustrating a Power Line Disturbance event and an inadequate filtering of the Power Line Disturbance event in the assertion of an EPOW signal;

FIG. 6A is an exemplary timing diagram illustrating a measurement of an actual holdup capacitance time for power supply modules during a power-down operation in accordance with one illustrative embodiment;

DETAILED DESCRIPTION OF THE ILLUSTRATIVE EMBODIMENTS

The illustrative embodiments provide mechanisms for controlling the timing of system notifications of an imminent power loss to a data processing system so as to filter out Power Line Disturbances. The mechanisms of the illustrative embodiments may be used in conjunction with power systems of data processing systems of various types. Any data processing system in which it is desirable to filter out PLD events from actual power loss events may utilize the mechanisms of the illustrative embodiments without departing from the spirit and scope of the present invention.

One data processing system in which the mechanisms of the illustrative embodiments may be utilized is in an IBM BladeCenter® chassis with one or more processor blades. While the IBM BladeCenter® chassis with one or more processor blades will be used as an example data processing system in which the illustrative embodiments are implemented, it should be appreciated that this is only an example and is not intended to state or imply any limitation with regard to the data processing environments in which the illustrative embodiments may be implemented. Many modifications to the exemplary illustrative embodiments described hereafter may be made without departing from the spirit and scope of the invention as defined in the claims set forth hereafter.

Figure 1A:
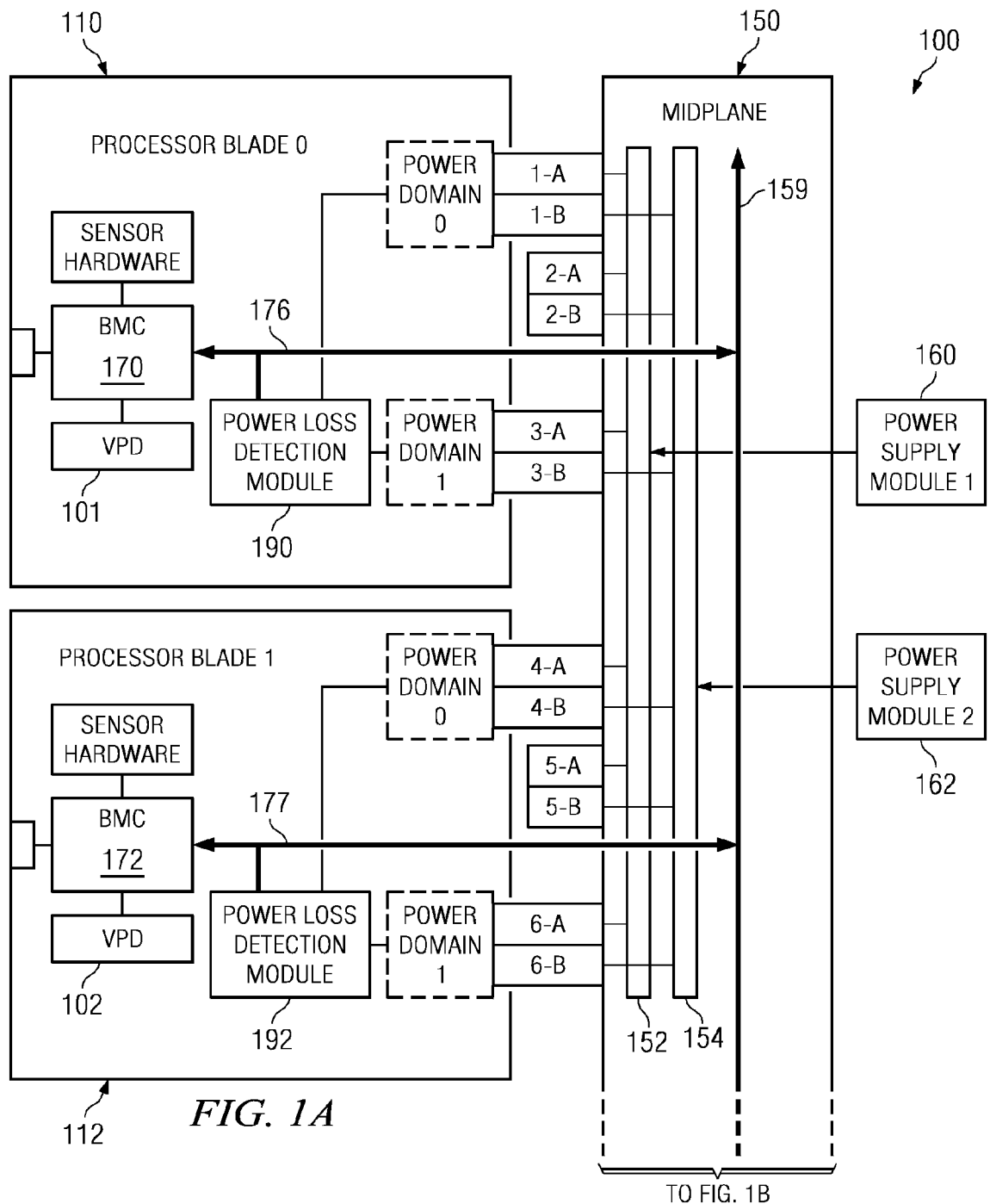
FIGS. 1A-1B are exemplary diagrams of a data processing system in which exemplary aspects of the illustrative embodiments may be implemented.
Figure 1B:
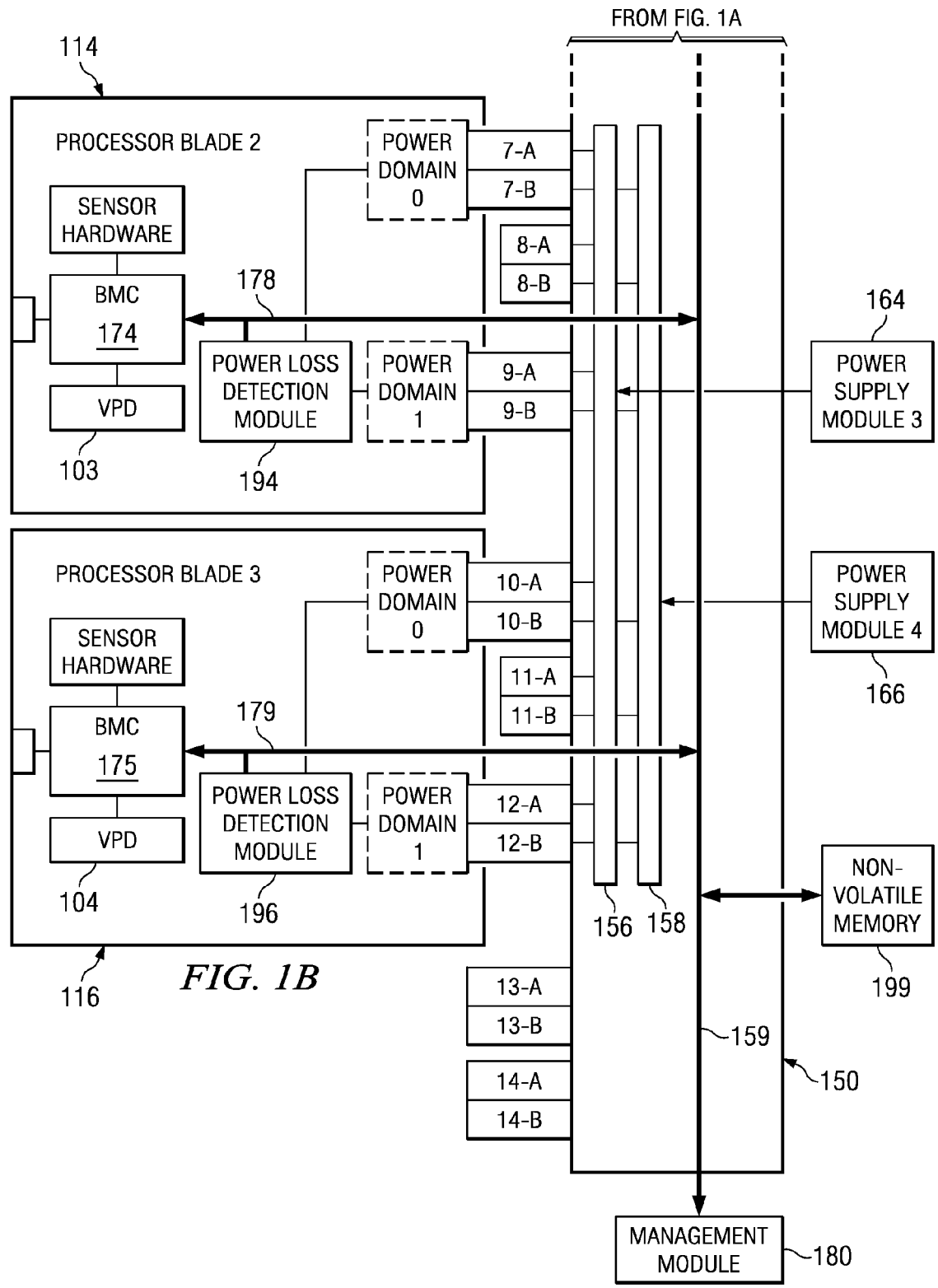

FIGS. 1A-1B are exemplary diagrams of a data processing system in which exemplary aspects of the illustrative embodiments may be implemented. As shown in FIGS. 1A-1B, the data processing system 100, which in this example is an IBM BladeCenter® chassis, comprises a plurality of data processing devices 110-116, which in the depicted example are three-slot wide blade subsystems, coupled to a plurality of power buses 152-158 of a midplane 150. The blade subsystems 110-116 may be, for example, blade storage systems, processor blades, ServerBlades, or the like. It should be appreciated, as mentioned above, that the use of blade subsystems and an IBM BladeCenter® chassis in the depicted example are not intended to limit the application of the present invention to other data processing systems which may utilize other data processing devices other than blade subsystems.

The power buses 152-158 receive power from respective ones of power supply modules 160-166. The blade subsystems 110-116 are connected to the midplane 150, and thus, the power buses 152-158, via slots in the midplane 150, which are referenced as 1-A, 1-B, 2-A, 2-B, etc. in FIGS. 1A-1B. It should be noted that, in the example of FIGS. 1A-1B, each slot location has redundant power input from two power supply modules via two power buses.

Each blade subsystem 110-116 includes a blade management controller (BMC) 170-175 which communicates with a management module 180 via a data bus 159 in the midplane 150 and data communication links 176-179 in the blade subsystem 110-116. The BMCs 170-175 are further in communication with a power loss detection module 190-196. The BMCs 170-175 provide basic environmental monitoring capabilities, out-of-band management capabilities of blade subsystems 110-116 via the management module 180, and are the control point for each blade subsystem 110-116. The BMC 170-175 communicates blade subsystem 110-116 state information to the management module 180 for use by the management module 180 in managing the operation of the blade subsystems 110-116, such as the power state of the blade subsystems 110-116. The BMCs 170-175 may obtain blade subsystem 110-116 state information from sensor hardware provided on the blade subsystem 110-116. The BMCs 170-175 may further operate based on vital product data (VPD) for each blade subsystem 110-116 stored in VPD storage devices 101-104.

Each blade subsystem 110-116 further supports a plurality of power domains, e.g., power domain 0 and power domain 1. A power domain, as the term is used herein, refers to power boundaries within the processor blades or blade subsystems 110-116 that are controlled by the management module 180. The multiple power domains illustrated in FIGS. 1A-1B are representations of power input to two separate blade subsystem slots. The power domains are combined in the blade subsystem 110-116 to provide power to the entire three-slot blade subsystem 110-116.

The power loss detection modules 190-196 may obtain inputs from the power domains 0 and 1 as well as VPD information from the VPD storage devices 101-104 and configuration information from the BMCs 170-175 and the management module 180. The power loss detection modules 190-196 detect Early Power Off Warning (EPOW) signals sent from the power supply modules 160-166 and differentiate the EPOW signals that are associated with a Power Line Disturbance (PLD) from an actual imminent loss of power to the data processing system 100. The power loss detection modules 190-196 may then communicate a system notification of an imminent power loss to the BMCs 170-175 and/or management module 180 which may initiate operations in the associated blade subsystem 110-116 for maintaining the integrity of data stored and/or processed by the blade subsystem 110-116, e.g., by quiescing input/ouput (I/O) operations.

As shown in FIGS. 1A-1B, power in the data processing system 100 is a shared resource and power permissions are the mechanism by which the management module 180 controls that resource. Power permissions are determined during the data processing system 100 initialization or when a blade subsystem 110-116 is installed into the data processing system 100. The management module 180 obtains information from blade subsystems 110-116 during a pre-initialization phase and determines the power permissions to be granted. The management module 180 sends a set power permission message to the blade subsystem 110-116 informing it of the current power permission state. Once permission is granted, the blade subsystem 110-116 is enabled to transition to a fully functional state. If appropriate local power control permissions are granted by the management module 180, i.e. permission bits set to "enabled," local power commands on the blade subsystem 110-116, such as from a front panel power button on the blade subsystem 110-116, can be accepted. The management module 180 may deny power permission to a blade subsystem 110-116 based on whether there is sufficient power supply to permit the blade subsystem 110-116 to operate correctly.

Once the blade subsystem 110-116 is given power permissions from the management module 180 and is in a fully functional state, the power loss detection module 190-196 monitors the power state of the power domains for EPOW notification signals. The power loss detection module 190-196 takes into account the various power supply modules 160-166 providing valid power to the blade subsystem 110-116 in determining a power holdup capacitance time for the blade subsystem 110-116, i.e. a period of time that the blade subsystem 110-116 may be powered before the supplied power decays.

Based on this information, and a predetermined amount of time required to process an EPOW notification in the blade subsystem 110-116 such that data integrity is maintained, a period of time in which Power Line Disturbances (PLDs) may be filtered is determined. This period of time is used to delay sending a notification to the blade subsystem's process control logic (not shown), BMC 170-175 and/or management module 180 indicating that a blade subsystem 110-116 power loss is imminent. In this way, the maximum amount of time for filtering out PLDs is achieved and, as a result, blade subsystem 110-116 power-down operations due to PLDs rather than actual power loss situations may be avoided.

The notification may be sent directly to the blade subsystem's process control logic, which is integrated into the blade subsystem itself, rather than having to direct the notification through a BMC 170-175 or the management module 180 in order to begin initiating operations to ensure the integrity of data being handled by the blade subsystem as early as possible following detection that the event is indicative of a power loss rather than simply a PLD event. For example, if the blade subsystem provides a RAID subsystem or other hard disk type storage subsystem, it is desirable to initiate operations as soon as possible in the event of possible loss of power so as to not perform an incomplete write to a sector of the hard disk storage device.

As shown in FIGS. 1A-1B, each blade subsystem 110-116 may straddle a plurality of slots in the midplane 150. Moreover, each slot may receive power from a plurality of power supply modules 160-166. It can be seen from FIGS. 1A-1B that it is possible for a multi-slot wide blade subsystem 110-116 to span a plurality of IBM BladeCenter® power domains, for example if straddling IBM BladeCenter® slots 6 and 7 in FIGS. 1A-1B. It should be noted that for three-slot wide blade subsystems 110-116 as shown in FIGS. 1A-1B, taking power from the first and third plugged slot positions, IBM BladeCenter® slot positions 5, 6, 7, and 8 are of interest for this scenario. Thus, the position of the blade subsystem 110-116 within the IBM BladeCenter® chassis indicates which power supply module inputs affect the holdup capacitance time of the blade subsystem 110-116.

The blade subsystems 110-116 include the BMCs 170-175 which contain logic for determining with which slot(s) within the IBM BladeCenter® the blade subsystems 110-116 are coupled, i.e. the location or position of the blade subsystems 110-116. This identification may be performed based on a slot identifier associated with each slot in the IBM BladeCenter® chassis. The BMCs 170-175 may provide the slot identifier, or position information, to the power loss detection module 190-196 which uses this position information to identify which of the inputs from the power supply modules 160-166 are relevant to determining a holdup capacitance time for the particular blade subsystem 110-116.

In addition to the slot identifier or position information, the power loss detection modules 190-196 receive an IBM BladeCenter® chassis type identifier, e.g., BladeCenter-1, BladeCenter-H, etc., from the management module 180. The IBM BladeCenter® chassis type identifier provides information to the power loss detection modules 190-196 as to how the slots in the midplane 150 are organized. This information, along with the actual position or slot identifier provided by the BMCs 170-175 specifically identifies which power supply modules 160-166 are actually providing power to the blade subsystem 110-116 so that the power loss detection modules 190-196 may determine which set of power supply voltage inputs and EPOW inputs from corresponding power supply modules 160-166 are of relevance to the operation of a corresponding blade subsystem 110-116.

For example, if, based on the IBM BladeCenter® chassis type identifier and the slot or position identifier, the power loss detection module 190 determines that the blade subsystem 110 is completely located in one BladeCenter® power distribution network power domain, then only the power supply module EPOW inputs and input voltages from that domain are relevant and qualified for usage in determining a power state of the blade subsystem 110. If the power loss detection module 190 determines that the blade subsystem 110 straddles multiple BladeCenter® power distribution network power domains, then the EPOW inputs and input voltages of each of the BladeCenter® power supply modules providing power to the blade subsystem 110 are relevant and qualified for usage in the determination of the power state of the blade subsystem 110.

Figure 2:
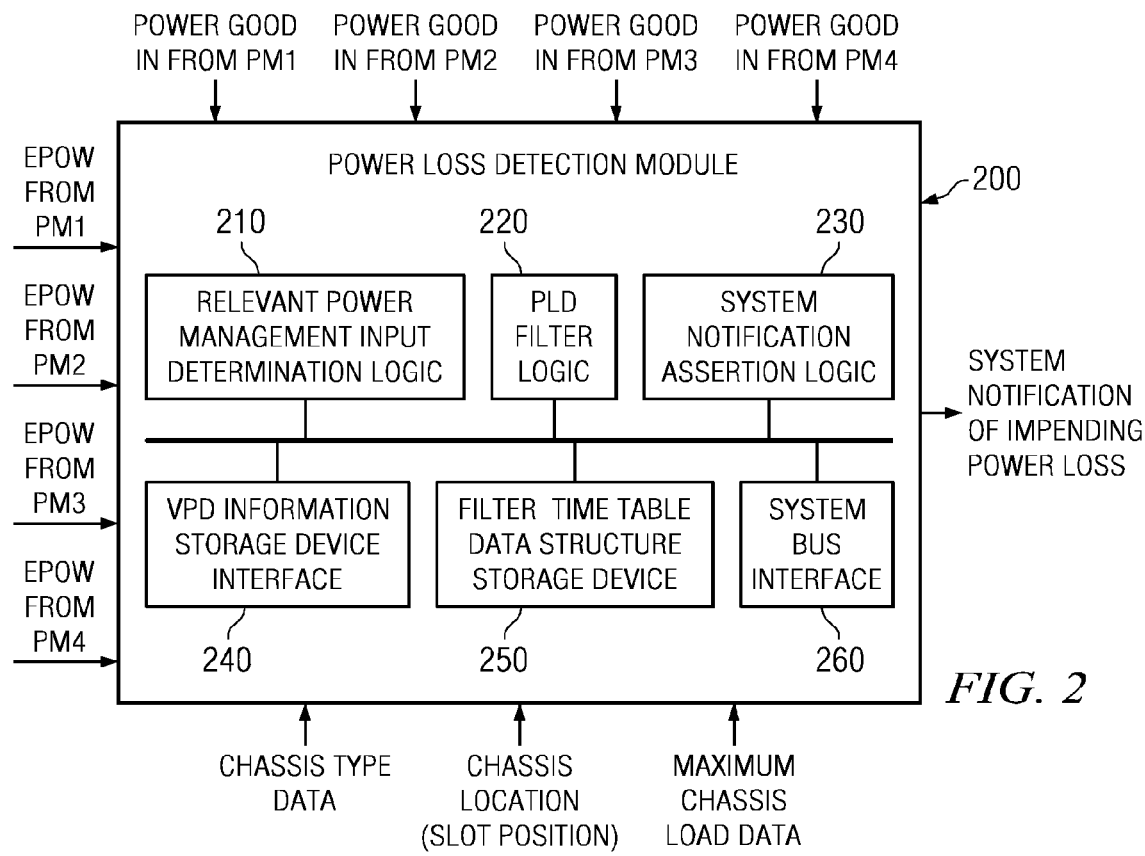
FIG. 2 is an exemplary block diagram of a power loss detection module in accordance with one illustrative embodiment.

FIG. 2 is an exemplary block diagram of a power loss detection module in accordance with one illustrative embodiment. As shown in FIG. 2, the power loss detection module 200 includes relevant power management input determination logic 210, Power Line Disturbance (PLD) filter logic 220, system notification assertion logic 230, vital product data (VPD) information storage device interface 240, filter time table data structure storage device 250, and system bus interface 260. The power loss detection module 200 further receives as inputs EPOW notification signals from each of the power supply modules (PMs), input voltages from each of the PMs (power good inputs from the PMs), a chassis type identifier, a chassis location identifier, and a maximum chassis load input. These inputs are processed by the elements 210 and 220 of the power loss detection module 200 to generate a system notification of impending power loss, at an appropriate timing relative to the assertion of an EPOW notification signal by a relevant PM. The system notification is sent to the blade subsystem's process control logic, BMC and/or management module which may then perform appropriate operations to power-down the blade subsystem associated with the power loss detection module 200 and ensure the integrity of data associated with the blade subsystem, e.g., by quiescing I/O operations prior to discontinuing power to the blade subsystem.

In one illustrative embodiment the relevant power management input determination logic 210 processes the chassis type identifier (received from the management module 180, for example) and the chassis location or slot identifier (received from the BMC 170, for example) to determine which of the EPOW input signals and voltage input signals from the various PMs are relevant to the power state of the blade subsystem that is associated with the power loss detection module 200. This determination may be performed in the manner previously described above. This determination may be made at blade subsystem initialization time, which may occur at the same time as initialization of the IBM BladeCenter® chassis, at a time when the blade subsystem is added to the IBM BladeCenter® chassis, or the like.

Once the relevant PM inputs are identified based on the chassis type and chassis location, the PM inputs are monitored by the power loss detection module 200 to determine the number of power supply modules installed and actively providing good input power to the blade subsystem. The number of power supply modules providing good input power defines the amount of reserve power available to blade subsystem's resources during a power loss situation, i.e. the duration in time where power can be expected to be maintained within specifications after the assertion of an EPOW notification by a PM. Knowledge of this available reserve power, also referred to herein as the holdup capacitance time, helps to determine the timing for filtering out PLD events and outputting a system notification of impending power loss.

For example, if the guaranteed reserve power available is equal to 10 msec with two PMs available, i.e. providing good input power, and 7 msec with one PM available, the duration of a PLD that can be tolerated, before a system notification of an impending power loss is output by the power loss detection module 200, will vary dependent upon the configuration of the number of power modules. If a blade subsystem requires 5 msec of reserve power to process a system notification of an impending power loss in order to place the blade subsystem in a condition that preserves data integrity, then the PLD tolerance of the blade subsystem is constrained by those parameters dependent upon the configuration. Thus, by enabling the power loss detection module 200 to monitor the input configurations, the PLD tolerance may be dynamically modified to optimize the duration of the tolerated PLD based on system configuration in any one instance.

For example, in the examples above, given 5 msec of reserve power required for processing a system notification of impending power loss, if two PMs are providing good input power, thereby providing 10 msec of reserve power, up to 5 msec of PLD may be tolerated, i.e. a PLD may occur for up to 5 msec before it is detected as being an actual power loss condition. If the PLD ceases within 5 msec, then the blade subsystem will not be aware that a PLD event occurred and the blade subsystem will not be powered down unnecessarily. Alternatively, if only one PM is providing good input power, thereby providing 7 msec of reserve power, up to 2 msec of PLD may be tolerated.

It should be appreciated that any relationship between a number of power modules providing good input power and a corresponding holdup capacitance time and/or PLD filter time may be supported by the mechanisms of the illustrative embodiments. For example, a linear relationship may be utilized with the mechanisms of the illustrative embodiments. Alternatively, a non-linear relationship may also be used without departing from the spirit and scope of the illustrative embodiments.

The various reserve power values, or holdup capacitance time values, may be maintained in a table data structure for use in filtering out PLD events and timing the sending of system notifications of impending power loss conditions. Such a table data structure may be stored, for example, in the filter time table data structure storage device 250. This table data structure may be utilized by the PLD filter logic 220 for filtering out PLD events. The PLD filter logic 220 may determine the number of PMs providing good input power, use this number to lookup a corresponding reserve power or holdup capacitance time in the table data structure of filter time table data structure storage device 250, and then monitor an asserted EPOW signal from a PM based on this reserve power or holdup capacitance time. The PLD filter logic 220 may use a system notification of imminent or impending power loss processing time value stored, for example, in the VPD information storage device accessible via the VPD information storage device interface 240, to determine a PLD filter time period.

The PLD filter logic 220 may determine how long the EPOW signal is asserted and compare that against the PLD filter time period. If the EPOW signal is asserted by the PM for longer than the PLD filter time period, then the PLD filter logic 220 instructs the system notification assertion logic 230 to assert a system notification signal indicative of imminent or impending power loss. If the EPOW signal is de-asserted by the PM prior to the PLD filter time period, then the PLD event does not affect the operation of the blade subsystem, i.e. a system notification signal of impending power loss is not asserted.

Thus, depending upon the particular configuration of the IBM BladeCenter® chassis, the location of the blade subsystem in the IBM BladeCenter® chassis, the number of power supply modules providing good input power to the blade subsystem, and a determined amount of time required for the blade subsystem to process a system notification of imminent or impending power loss, different sizes of PLD events may be filtered out by the mechanisms of the illustrative embodiments and different timings of system notifications of imminent or impending power loss may be utilized. In this way, the maximum size PLD events may be tolerated for the particular configuration of the IBM BladeCenter® system.

FIG. 3 is an exemplary timing diagram illustrating a Power Line Disturbance event and the filtering of the Power Line Disturbance event in the assertion of an EPOW signal in accordance with one illustrative embodiment. The timing diagrams in FIG. 3 illustrate the behavior characteristics of a typical power system design of an IBM BladeCenter® chassis with respect to EPOW generation during PLD events as well as real AC power loss events. It can be seen from FIG. 3 that a Power Line Disturbance (PLD) event causes an EPOW condition to be generated for an amount of time that is directly proportional to the PLD duration. The width of the PLD event identified in the AC power input corresponds to the width of the EPOW signal asserted by a power supply module, shown as signal waveform B in FIG. 3, being asserted (a drop in the EPOW signal waveform in FIG. 3 represents an assertion of an EPOW signal). As mentioned above, it is desirable to "ride through" PLD events so as to not power-down the blade subsystem for relatively short PLDs.

As discussed above, the illustrative embodiments herein utilize the advantage of having a plurality of power supply modules providing good input power to a blade subsystem, and thereby providing increased holdup capacitance time, i.e. PLD ride through capability, to maximize the size of the PLD events that may be filtered out by the mechanisms of the illustrative embodiments. Even though power supply modules are typically added to a system in pairs for redundancy purposes, it should be appreciated that the mechanisms of the illustrative embodiments may be applied to any number of power supply modules, e.g., three, five, seven, etc.

As shown in FIG. 3, an inadequately filtered EPOW signal, i.e. the adjusted EPOW signal C, may result in a powering down of a corresponding blade subsystem, as represented by the drop of waveform C from a high level to a low level following the assertion of the EPOW signal in waveform B. This is the case that may be experienced in known systems where inadequate filtering of PLD events is performed because the conditions of the data processing system's power distribution network are not considered in determining an adequate filtering time for PLD events. Thus, since the PLD filtering time may be fixed at an inadequate value, the PLD event may cause the system to power-down the data processing device, e.g., a blade subsystem, in response to the PLD event even though the power supply modules driving the blade subsystem may have sufficient holdup capacitance time to ride through the PLD event.

With the illustrative embodiments herein, the PLD event filtering is adjusted based on the power distribution network's current conditions at the time that an EPOW signal is asserted by a power supply module. In response to the EPOW signal being asserted, a power loss detection module, such as that shown in FIG. 2 above, associated with a data processing device, e.g., a blade subsystem, determines a PLD filter time based on a determined reserve power and required time for processing the EPOW notification in the data processing device. This PLD filter time is applied to PLD events identified to the power loss detection module by way of the assertion of the EPOW notification signals.

As shown in FIG. 3, rather than performing a powering down of the data processing device at the point where the adjusted EPOW signal drops in waveform C, an additional PLD filter time period is added to the adjusted EPOW notification signal as shown in waveform D. Because this additional PLD filter time period is added to the adjusted EPOW signal, and thus, the EPOW signal is adequately filtered, the resulting PLD event discontinues prior to the expiration of the PLD filter time period. As a result, a system notification of an impending power loss is not asserted to the data processing device and the data processing device is not powered down.

As mentioned above, before a data processing device, such as a blade subsystem 110-116 or any other field replaceable unit (FRU), can operate within the data processing system 100, e.g., the IBM BladeCenter® chassis system, the management module 180 in FIGS. 1A-1B must provide power permission to the data processing device or FRU so that it may power-up. Each of these FRUs, e.g., blade subsystems, may have differing power consumption characteristics and thus, may generate a different load on the data processing system's power distribution network, which again is a shared resource within the data processing system 100. The mechanisms of the illustrative embodiments may take into consideration the load generated by the particular combination of data processing devices/FRUs, e.g., blade subsystems, that are powered-on by the management module 180 when adjusting the PLD filter time applied to asserted EPOW signals.

As discussed above, when the management module 180 determines that a particular blade subsystem, or other FRU, is to be powered-on to a fully functional state, the VPD information associated with that blade subsystem or FRU may be updated to indicate this fully functional state. The VPD information may further include information about the power consumption requirements of the associated FRU or blade subsystem. This VPD information for the various powered-on blade subsystems and FRUs may be read by the management module 180 and used to calculate a data processing system load value. The data processing system load value may then be communicated, by the management module 180, to the BMCs 170-175 of the various blade subsystems 110-116. The BMCs 170-175 may provide this load information to the power loss detection modules 190-196 for use in adjusting PLD filter time values, or reserve power values, in a table of values in the filter time table data structure storage device 250.

Such adjustment may comprise, for example, decreasing the PLD filter time as the load on the power distribution network of the data processing system 100 increases. For example, if an available power capacity of the power distribution network is 50%, i.e. the powered-on FRUs are only consuming 50% of the available power, then a PLD filter time may be 5 msec. However, when the available power capacity decreases to 20%, i.e. 80% of the available power is being consumed, this same PLD filter time may be reduced to 3 msec. Similarly, if the available power capacity were to decrease even further to 5%, the PLD filter time may be reduced to 1 msec. Again, any relationship between available power capacity and PLD filter time, e.g., linear or non-linear, may be used with the mechanisms of the illustrative embodiments.

The particular amount by which the PLD filter time is reduced may be determined by logic provided in the BMCs 170-175, the management module 180, or in the power loss detection modules 190-196. For example, a table of weighting factors may be provided for various percentages of available power and these weighting factors may be applied to the PLD filter times previously calculated in the manner described above, e.g., PLD filter times provided in a table data structure or the like.

In addition to adjusting the PLD filter times based on a loading of the power distribution network as determined by the VPD information for the powered-on FRUs, the actual capacitance values of the various power supply modules may be used as a basis for adjusting the PLD filter times. The actual capacitance values of the various power supply modules provide different power supply holdup capacitance times. Such holdup capacitance time values are typically provided by utilizing large polarized electrolytic capacitors in the 1000's of microfarad range. While such capacitor technology is best suited for providing large capacitance values, it is well known that the capacitance value of a given capacitor is not well controlled and can result in a variation of capacitance (and EPOW signal generation) of up to +/−20%. Moreover, the power supply module must be designed to account for the large variation in capacitance, resulting in a substantially different EPOW holdup capacitance time from one power supply to the next. Thus, discrepancies in capacitance of the power supply modules may affect the duration of the assertion of an EPOW signal by the power supply modules.

The actual capacitance values may be determined at manufacture/test time and stored in VPD data storage associated with each power supply module. This VPD data may be read by the management module 180 at initialization time, i.e. when the power supply module is powered-on, and used to determine an adjustment factor for PLD filter times that are applied by the power loss detection modules 190-196 of the blade subsystems 110-116, e.g., an adjustment factor for adjusting the length of time that the EPOW signal is asserted.

FIG. 4 is an exemplary timing diagram illustrating a Power Line Disturbance event and an inadequate filtering of the Power Line Disturbance event in the assertion of an EPOW signal. As shown in FIG. 4, waveform A represents the AC power input to a power supply module, waveforms B and C represent the EPOW signals output by two respective power supply modules. Dual power supply modules are used to provide a level of redundancy. Waveform D represents a summary of the two waveforms B and C, and waveform E represents an inadequately filtered EPOW signal. As shown in FIG. 4, the PLD event causes an EPOW condition to be generated for an amount of time that is directly proportional to the PLD duration.

Both EPOW signals generated by the two power supply modules B and C are required to be monitored. That is, a system shutdown is not initiated unless both EPOW signals are asserted. In the depicted example, with waveform E, which is inadequately filtered in a manner generally known in the art, results in a total system shutdown of the blade subsystem at the point at which the waveform E drops to a low level.

Figure 5:
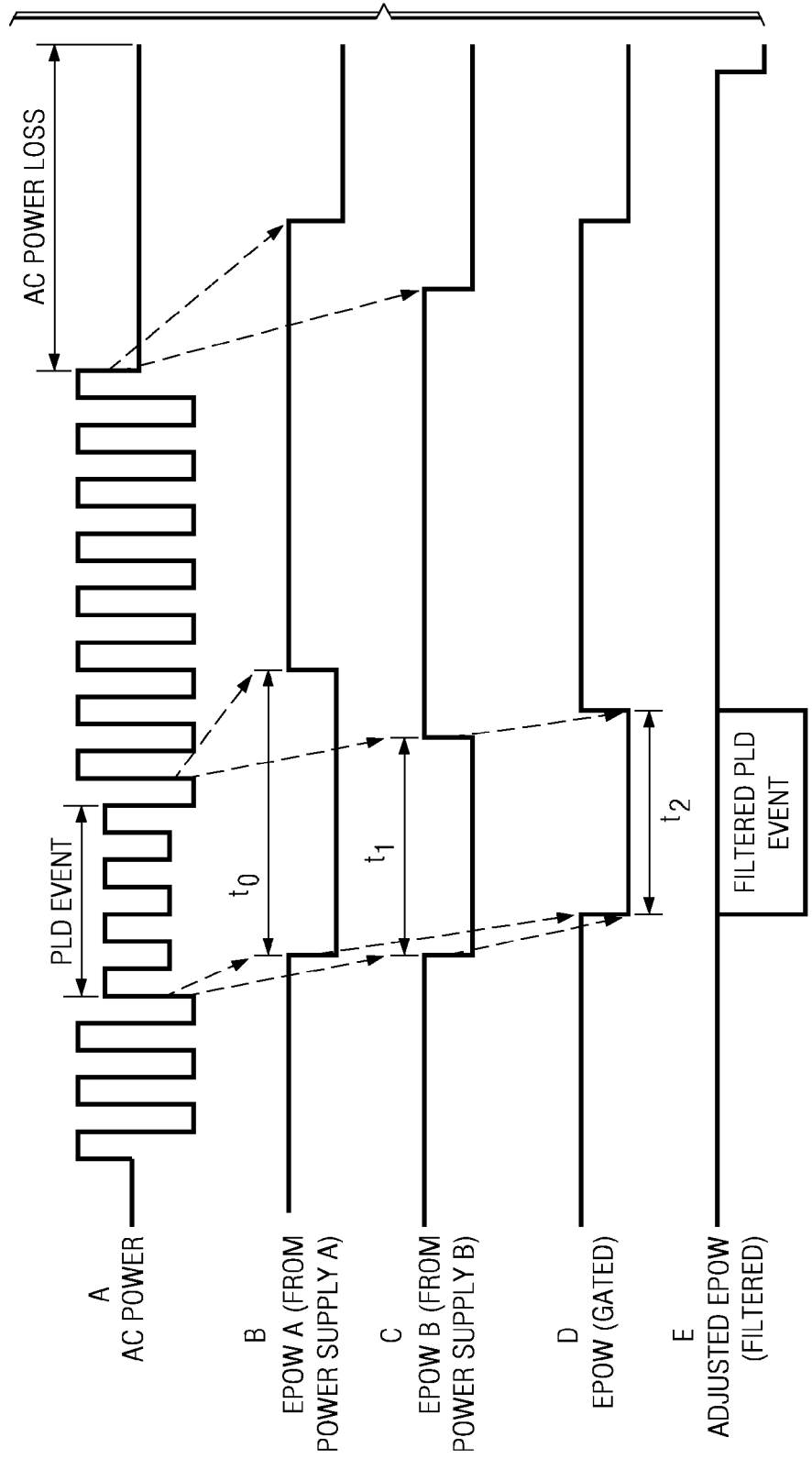
FIG. 5 is an exemplary timing diagram illustrating the assertion of an EPOW signal by power supply modules having differing holdup capacitance times and a resulting filtered EPOW signal in accordance with one illustrative embodiment.

FIG. 5 is an exemplary timing diagram illustrating the assertion of an EPOW signal by power supply modules having differing holdup capacitance times and a resulting filtered EPOW signal in accordance with one illustrative embodiment. FIG. 5 shows two EPOW signals B and C that have different EPOW durations t0 and t1, respectively. These two different EPOW durations are due to component variance in power supply input sense detection. The duration may also be affected by different line cord sources. Showing the synchronized activation of the EPOW events is an idealization for illustration purposes. The shorter of the two EPOW durations limits the effect of the PLD filter timing. That is, when the shorter EPOW recovers, the PLD filter logic resets.

Signal D in FIG. 5 illustrates a minimized EPOW signal duration, t2, which corresponds to the minimum EPOW duration of t0 and t1. If t2 is sufficiently small and the related PLD filtering mechanisms monitors both edges of EPOW, then PLD events that fall within this time span can be successfully thresholded, preventing blade subsystem shutdown. Such successful thresholding is illustrated with regard to signal E in FIG. 5. With such adequate filtering of EPOW events, the EPOW event may occur and the system remains up since the EPOW event is filtered out by the mechanisms of the illustrative embodiments.

Thus, the illustrative embodiments provide mechanisms for determining a PLD filter time based on the particular configuration of the data processing system, the location of a particular data processing device (e.g., blade subsystem) within the data processing system, and the number of power supply modules providing good input power to the data processing device. In addition, mechanisms are provided for adjusting such a calculated PLD filter time based on the system load on the power distribution network of the data processing system. Moreover, mechanisms may be provided for adjusting such a calculated PLD filter time based on the holdup capacitance values of the power supply modules providing good input power to the data processing device.

It should be appreciated that the mechanisms of the illustrative embodiments may operate at an initialization time of the data processing system, at initialization time of the data processing device, or the like. Thus, in some illustrative embodiments, the mechanisms operate in a static manner. However, dynamic operation of the illustrative embodiments is also provided. For example, if the configuration of the data processing system changes, the mechanisms of the illustrative embodiments may operate to adjust the PLD filter time valuations. Moreover, mechanisms of the illustrative embodiment may operate in response to power supply modules asserting EPOW signals, in which case the PLD filter time may be determined and applied to the asserted EPOW signals to determine when to assert a system notification of an impending power loss.

In addition to the above mechanisms, the illustrative embodiments further provide mechanisms for performing dynamic measurements of actual holdup capacitance times of power supply modules during a powering down operation. These dynamic measurements may be used to modify the actual holdup capacitance time values that are used by the mechanisms of the illustrative embodiments when adjusting the PLD filter time.

FIG. 6A is an exemplary timing diagram illustrating a measurement of an actual holdup capacitance time for power supply modules during a power-down operation in accordance with one illustrative embodiment. As shown in FIG. 6A, the two power supply modules A and B may have two different holdup capacitance times. That is, there is a time difference between when an EPOW signal is asserted and when its respective output voltage begins to decay for each power supply module A and B. In FIG. 6A, t1 is the holdup capacitance time for power supply module A and t2 is the holdup capacitance time for power supply module B.

Again, both EPOW events are monitored prior to taking any actions to shutdown the data processing device or system, e.g., the blade subsystem. As mentioned above, it has been determined that the holdup capacitance time of a power supply module may be, in reality, +/−20% of the reported holdup capacitance value. For example, one power supply module may have a −20% holdup capacitance time and a second power supply module may have a +20% holdup capacitance time. As a result, the holdup capacitance time through which EPOW events may be filtered may be very different from the reported holdup capacitance time at manufacture/test time.

Figure 6B:
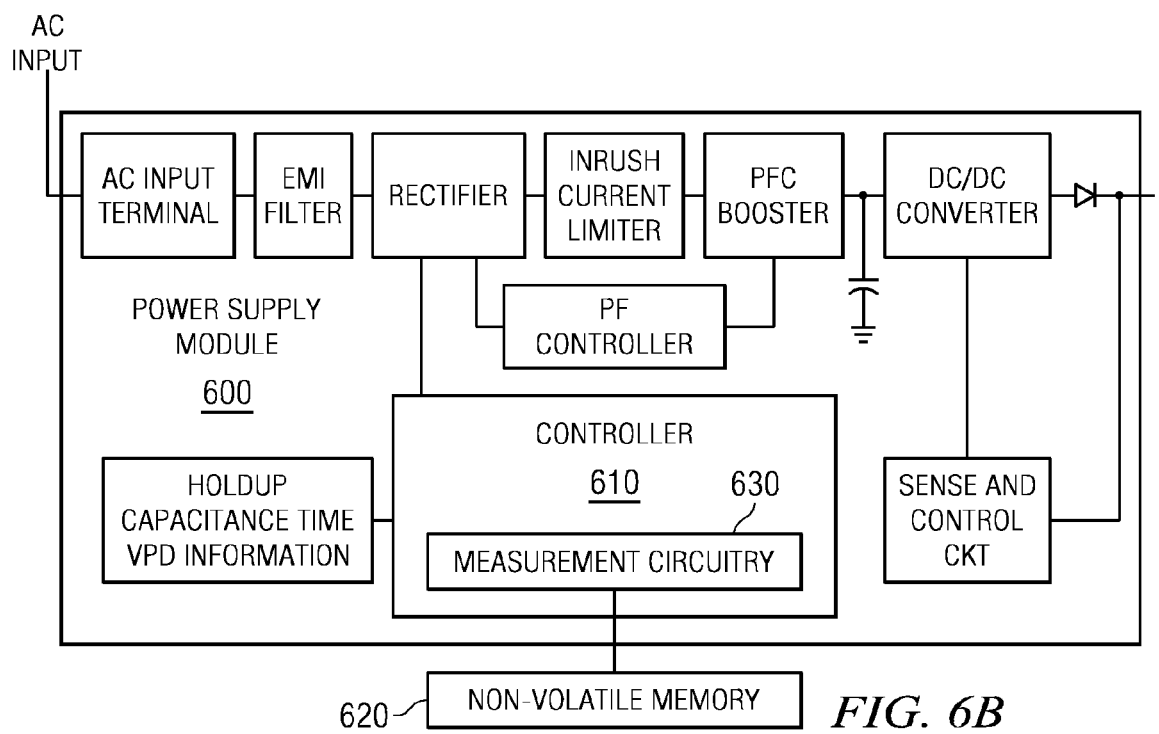
FIG. 6B is an exemplary block diagram of a power supply module in accordance with one illustrative embodiment.

With reference to FIG. 6B, to determine the actual holdup time of each power supply module 600, a controller 610 of the power supply module 600 may, via measurement circuitry 630, during power-down operations, monitor each EPOW signal assertion in conjunction with its respective power input to the controller 610. This may be measured as t1 or t2 in FIG. 6A, for example. Both values may be stored in non-volatile memory 620, which may be non-volatile memory 199 in FIGS. 1A-1B, for example, prior to losing all power in the power supply module 600. Even though power is decaying while the non-volatile memory 620 is being updated, there is sufficient time to complete the update due to internal power regulation mechanisms of the data processing device, e.g., the blade subsystem, that maintain stable voltages, e.g., 5V and 12V, in the data processing device.

After power is restored to the data processing device, e.g., blade subsystem, the management module 180 reads the non-volatile memory 620 and compares the current holdup capacitance time values that were written to the non-volatile memory 620 during the previous power-down operation. The largest holdup capacitance time value is applied to the PLD filtering mechanisms in the power loss detection modules 190-196 of the various data processing devices. For example, the largest holdup capacitance time value may be used to generate an adjustment factor that is output to the various power loss detection modules 190-196 which use this adjustment factor to adjust the PLD filter time calculated based on the table data structures of the power loss detection modules 190-196. Thus, the mechanisms of the illustrative embodiments result in being able to threshold the largest PLD event possible given the largest actual holdup time of the combined power supply modules 160-166.

Thus, in addition to adjusting PLD filter time values based on VPD information identifying loads on the power distribution network of the data processing system and VPD information identifying holdup capacitance time values at manufacture/test time of the power supply modules, the mechanisms of the illustrative embodiments provide for the adjustment of PLD filter time based on actual measured holdup capacitance times of the power supply modules. Each of these mechanisms, along with the basic PLD filter time determination mechanism based on data processing system configuration, data processing device location, and a number of power supply modules providing good input power to the data processing device, may be used in any desired combination in order to achieve a desired operation of the power distribution network of the data processing system.

Figure 7:
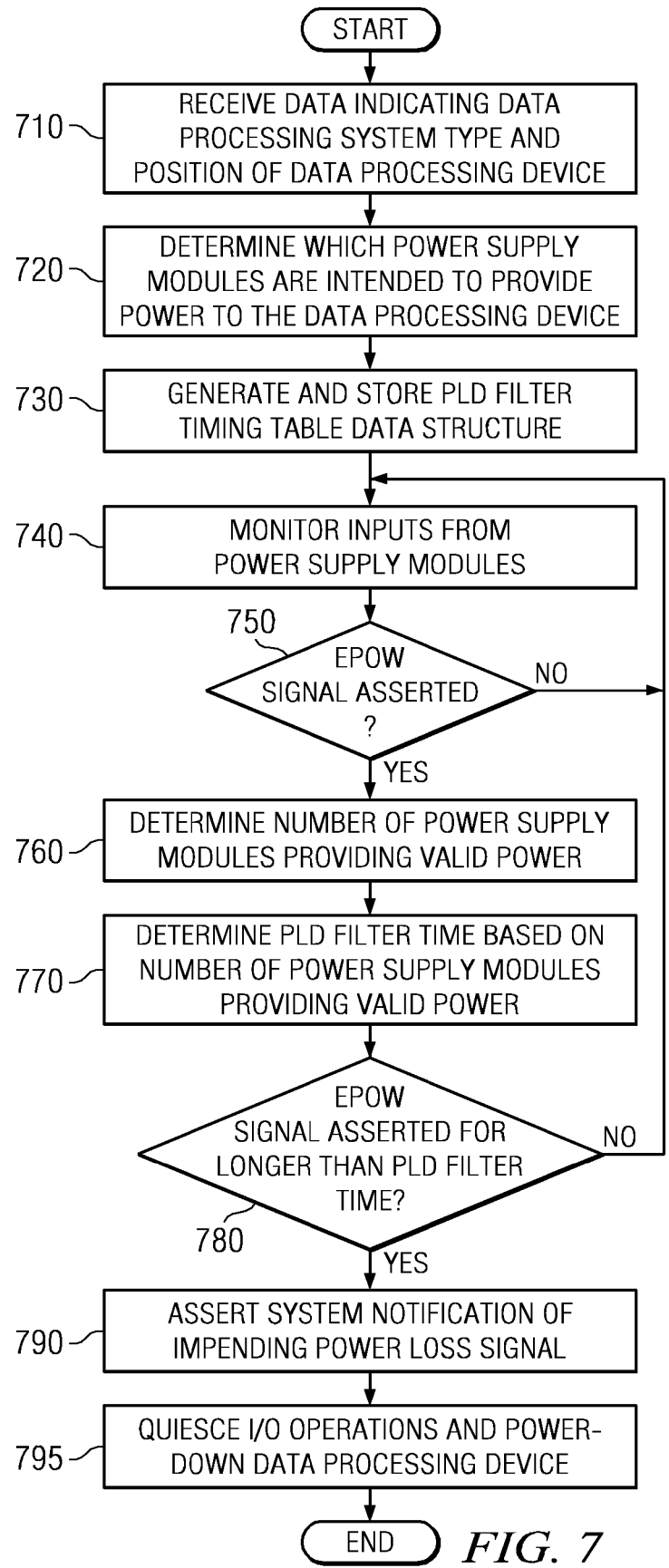
FIG. 7 is a flowchart outlining an exemplary operation for adjusting a timing of a system notification of an impending power loss in accordance with one illustrative embodiment.
Figure 8:
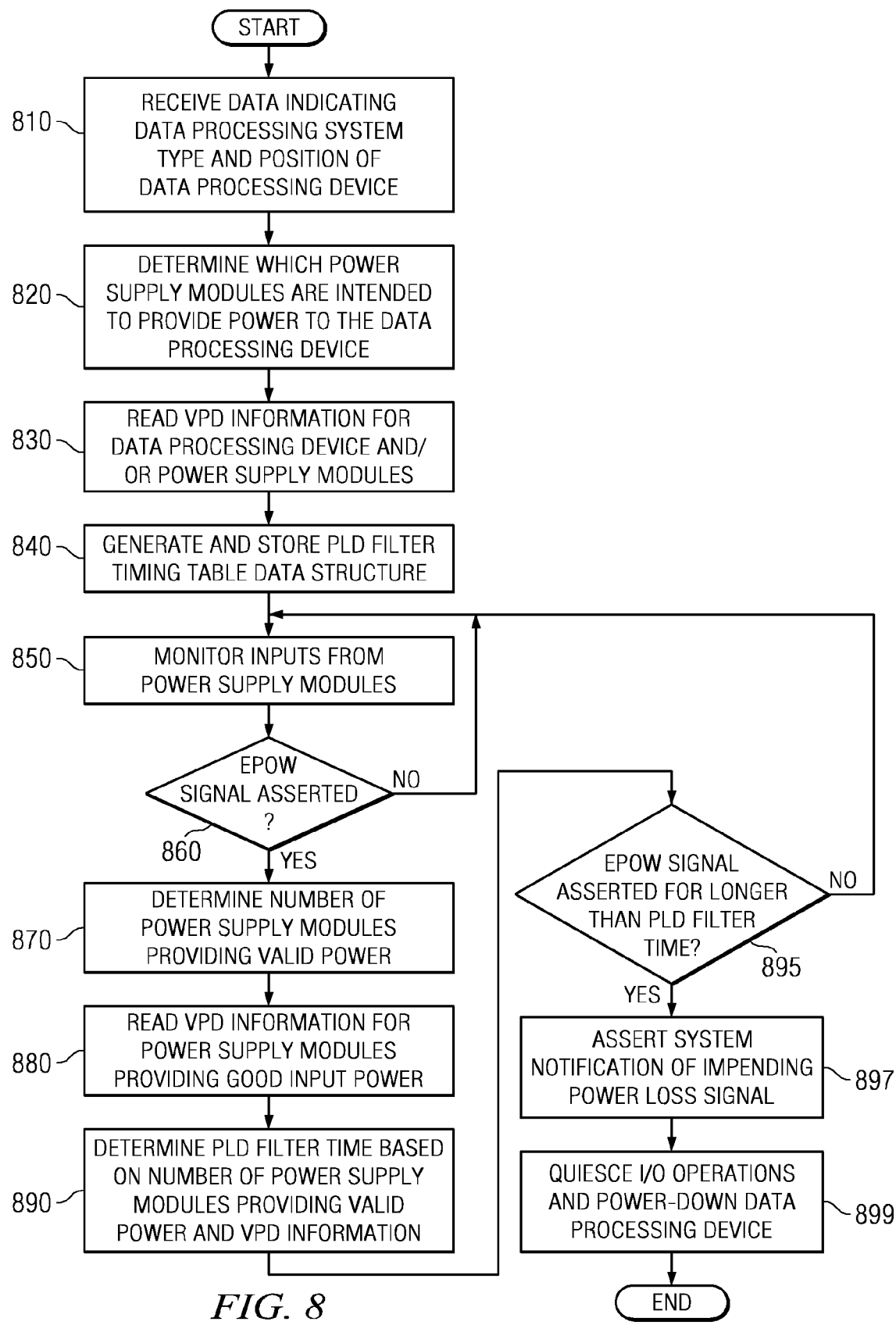
FIG. 8 is a flowchart outlining an exemplary operation for adjusting a timing of a system notification of an impending power loss based on VPD information for power supply system elements in accordance with one illustrative embodiment.
Figure 9:
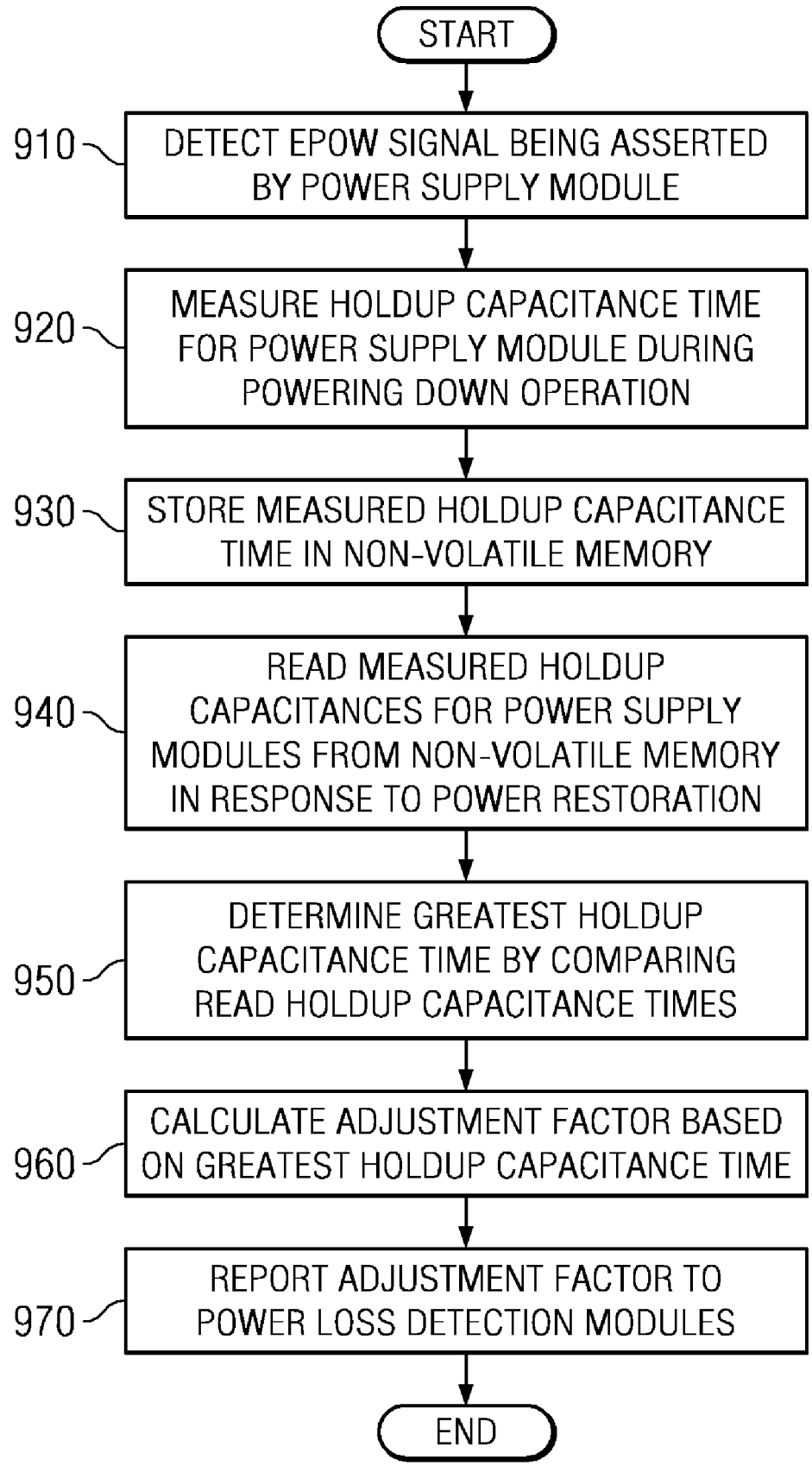
FIG. 9 is a flowchart outlining an exemplary operation for adjusting a timing of an assertion of an EPOW notification signal based on a measured actual holdup capacitance time of a power supply module in accordance with one illustrative embodiment.

FIGS. 7-9 are flowcharts outlining exemplary operations for controlling the generation of system notifications of impending power loss and powering down of data processing devices in accordance with various illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIG. 7 is a flowchart outlining an exemplary operation for adjusting a timing of a system notification of an impending power loss in accordance with one illustrative embodiment. As shown in FIG. 7, the operation starts with the power loss detection module receiving data indicating the type of data processing system and the position of an associated data processing device within the data processing system (step 710). The power loss detection module determines which power supply modules are intended to provide power to the data processing device based on the data processing system type and the position of the data processing device within the data processing system (step 720). The power loss detection module then generates and stores a PLD filter timing data structure based on the determined power supply modules that are intended to provide power to the data processing device (step 730). This table may store PLD filter timing values for various numbers of power supply modules within the identified power supply modules that are intended to provide power to the data processing device.

The power loss detection module then monitors EPOW notification input lines from the power supply modules that are intended to provide power to the data processing device for an asserted EPOW signal (step 740). A determination is made as to whether a relevant EPOW signal is asserted (step 750). If not, the operation returns to step 740. If a relevant EPOW signal is asserted, then a number of relevant power supply module input voltage signals from power supply modules providing a good power input are determined (step 760). Based on the number of power supply modules providing a good power input, a corresponding PLD filter time is identified in the table data structure (step 770). This PLD filter time may be a reserve power value or holdup capacitance time, or it may be an actual maximum PLD event size as determined by a difference between the reserve power value or holdup capacitance time and a required amount of time for processing the EPOW signal in the data processing device.

The PLD filter time is applied to the asserted EPOW signal to determine if the EPOW signal is asserted for longer than the PLD filter time (step 780). If the EPOW signal is not asserted for longer than the PLD filter time, then the operation returns to step 740. Otherwise, if the EPOW signal is asserted for longer than the PLD filter time, then a system notification of an impending power loss is asserted (step 790). Based on this system notification of an impending power loss, the data processing device may quiesce I/O operations and be powered-down (step 795). The operation then terminates.

FIG. 8 is a flowchart outlining an exemplary operation for adjusting a timing of a system notification of an impending power loss based on VPD information for power supply system elements in accordance with one illustrative embodiment. As shown in FIG. 8, the operation starts with the power loss detection module receiving data indicating the type of data processing system and the position of an associated data processing device within the data processing system (step 810). The power loss detection module determines which power supply modules are intended to provide power to the data processing device based on the data processing system type and the position of the data processing device within the data processing system (step 820). VPD information for the data processing device and/or the power supply modules may then be read from VPD storage devices (step 830). The power loss detection module may then generate and stores a PLD filter timing data structure based on the determined power supply modules that are intended to provide power to the data processing device and the read VPD information (step 840). This table may store PLD filter timing values for various numbers of power supply modules within the identified power supply modules that are intended to provide power to the data processing device.

The power loss detection module then monitors EPOW notification input lines from the power supply modules that are intended to provide power to the data processing device for an asserted EPOW signal (step 850). A determination is made as to whether a relevant EPOW signal is asserted (step 860). If not, the operation returns to step 850. If a relevant EPOW signal is asserted, then a number of relevant power supply module input voltage signals from power supply modules providing a good power input are determined (step 870). Moreover, VPD information for the power supply modules providing good power input may be read (step 880). Based on the number of power supply modules providing a good power input, and optional VPD information for the power supply modules providing good power input, a corresponding PLD filter time is identified in the table data structure (step 890). This PLD filter time may be a reserve power value or holdup capacitance time, or it may be an actual maximum PLD event size as determined by a difference between the reserve power value or holdup capacitance time and a required amount of time for processing the EPOW signal in the data processing device.

The PLD filter time is applied to the asserted EPOW signal to determine if the EPOW signal is asserted for longer than the PLD filter time (step 895). If the EPOW signal is not asserted for longer than the PLD filter time, then the operation returns to step 850. Otherwise, if the EPOW signal is asserted for longer than the PLD filter time, then a system notification of an impending power loss is asserted (step 897). Based on this system notification of an impending power loss, the data processing device may quiesce I/O operations and be powered-down (step 899). The operation then terminates.

FIG. 9 is a flowchart outlining an exemplary operation for adjusting a timing of an assertion of an EPOW notification signal based on a measured actual holdup capacitance time of a power supply module in accordance with one illustrative embodiment. As shown in FIG. 9, the operation starts with detecting an EPOW signal being asserted by a power supply module (step 910). The holdup capacitance time for the power supply module during a powering down operation is measured (step 920). The measured holdup capacitance time for the power supply module is stored to non-volatile memory (step 930).

At power restoration, the management module reads the measured holdup capacitance times stored in the non-volatile memory (step 940). A greatest measured holdup capacitance time is determined by comparing the read measured holdup capacitance times (step 950). The greatest measured holdup capacitance time is then used to calculate an adjustment factor (step 960) which is reported to the power loss detection modules of the data processing devices (step 970). The operation then terminates.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer useable storage medium having a computer readable program, wherein the computer readable program, when executed on a data processing system, causes the data processing system to:

access vital product data (VPD) information for each of a plurality of data processing devices within the data processing system;

identify one or more data processing devices of the plurality of data processing devices that are powered-on to a fully functional state;

measure an actual holdup capacitance time for a power supply module asserting an Early Power Off Warning (EPOW) signal;

store the actual holdup capacitance time in a vital product data (VPD) storage device associated with the power supply module;

determine a current power distribution network configuration relative to the one or more data processing devices based on the identified one or more data processing devices that are powered-on to a fully functional state, in response to the power supply module of the data processing system asserting the EPOW signal; and assert a power loss notification signal, indicative of an imminent power loss to the data processing device, to logic of the data processing system based on the determined current power distribution network configuration relative to the one or more data processing devices, wherein the current power distribution network configuration is determined based on the actual holdup capacitance time stored in the VPD storage device associated with the power supply module.

2. The computer program product of claim 1, wherein the actual holdup capacitance time is measured at one of manufacture or testing time of the power supply module.

3. The computer program product of claim 1, wherein the actual holdup capacitance time is measured dynamically during a power-down operation of the power supply module.

4. The computer program product of claim 3, wherein the actual holdup capacitance time for a plurality of power supply modules of the data processing system are measured dynamically during power-down operations of the plurality of power supply modules.

5. The computer program product of claim 4, wherein the actual holdup capacitance time for each of the plurality of power supply modules is stored in one or more non-volatile memories associated with the plurality of power supply modules prior to complete loss of power by the power supply modules during the power-down operations.

6. The computer program product of claim 5, wherein the actual holdup capacitance time values for each of the plurality of power supply modules of the data processing system are read from the one or more non-volatile memories by a management module of the data processing system in response to a restoration of power to the plurality of power supply modules, and wherein a largest actual holdup capacitance time of the plurality of power supply modules is utilized to calculate an adjustment value for adjusting the PLD filter time.

7. A data processing system, comprising:
at least one data processing device;
at least one power supply module coupled to the at least one data processing device; and
power loss detection logic coupled to at least one of the at least one data processing device or the at least one power supply module, wherein the power loss detection logic:
accesses vital product data (VPD) information for each of a plurality of data processing devices within the data processing system;
identifies one or more data processing devices of the plurality of data processing devices that are powered-on to a fully functional state;
determines a current power distribution network configuration relative to the one or more data processing devices based on the identified one or more data processing devices that are powered-on to a fully functional state, in response to a power supply module of the data processing system asserting an Early Power Off Warning (EPOW) signal; and
asserts a power loss notification signal, indicative of an imminent power loss to the data processing device, to logic of the data processing system based on the determined current power distribution network configuration relative to the one or more data processing devices, wherein logic of the power supply module:
measures an actual holdup capacitance time for the power supply module; and
stores the actual holdup capacitance time in a vital product data (VPD) storage device associated with the power supply module, and wherein the current power distribution network configuration is determined based on the actual holdup capacitance time stored in the VPD storage device associated with the power supply module.

8. The system of claim 7, wherein the actual holdup capacitance time is measured at one of manufacture time of the power supply module or testing time of the power supply module.

9. The system of claim 7, wherein:
the actual holdup capacitance time is measured dynamically during power-down operations of a plurality of power supply modules,
the actual holdup capacitance time for each of the plurality of power supply modules is stored in one or more non-volatile memories associated with the plurality of power supply modules prior to complete loss of power by the power supply modules during the power-down operations,
the actual holdup capacitance time values for each of the plurality of power supply modules of the data processing system are read from the one or more non-volatile memories by a management module of the data processing system in response to a restoration of power to the plurality of power supply modules, and
a largest actual holdup capacitance time of the plurality of power supply modules is utilized to calculate an adjustment value for adjusting the PLD filter time.

* * * * *